(12) United States Patent
Park

(10) Patent No.: US 11,346,123 B2
(45) Date of Patent: May 31, 2022

(54) ROOFTOP TENT FOR VEHICLE

(71) Applicant: IKAMPER CO., LTD., Paju-si (KR)

(72) Inventor: Soon Gyu Park, Paju-si (KR)

(73) Assignee: IKAMPER CO., LTD., Paju-si (KR)

( * ) Notice: Subject to any disclaimer, the term of this patent is extended or adjusted under 35 U.S.C. 154(b) by 0 days.

(21) Appl. No.: 17/260,230

(22) PCT Filed: Aug. 27, 2019

(86) PCT No.: PCT/KR2019/010939
§ 371 (c)(1),
(2) Date: Jan. 14, 2021

(87) PCT Pub. No.: WO2020/045956
PCT Pub. Date: Mar. 5, 2020

(65) Prior Publication Data
US 2021/0270055 A1  Sep. 2, 2021

(30) Foreign Application Priority Data
Aug. 27, 2018 (KR) .................... 10-2018-0100616

(51) Int. Cl.
*E04H 15/06* (2006.01)
*B60P 3/39* (2006.01)
*E04H 15/48* (2006.01)

(52) U.S. Cl.
CPC ............... *E04H 15/06* (2013.01); *B60P 3/39* (2013.01); *E04H 15/48* (2013.01)

(58) Field of Classification Search
CPC ................................................ E04H 15/06
See application file for complete search history.

(56) References Cited

U.S. PATENT DOCUMENTS 2,291,900 A * 8/1942 Jimmes .................... B60P 3/38
135/88.13
2,811,725 A * 11/1957 Cence ...................... B60P 3/38
5/119
(Continued)

FOREIGN PATENT DOCUMENTS

CN 108468466 A * 8/2018
CN 111734206 A * 10/2020
(Continued)

OTHER PUBLICATIONS

International Search Report for PCT/KR2019/010939 dated Dec. 9, 2019 from Korean Intellectual Property Office.

*Primary Examiner* — David R Dunn
*Assistant Examiner* — Danielle Jackson
(74) *Attorney, Agent, or Firm* — Revolution IP, PLLC

(57) ABSTRACT

A roof-top tent for a vehicle includes: a base plate detachably fixed to the roof of the vehicle, an expansion plate rotatably connected to the base plate to overlap with the base plate, a cover rotatably connected to the base plate and opening and closing an upper surface of the base plate, a tent unit connected to the base plate and spreading out when the cover is rotated from the base plate to allow the upper surface of the base plate to be opened, and a folding assistance unit for assisting the tent unit to prevent the tent unit from being exposed to an outside of the cover when the tent unit is folded back after it is spread out.

4 Claims, 4 Drawing Sheets

(56) References Cited

U.S. PATENT DOCUMENTS

| | | | | |
|---|---|---|---|---|
| 3,351,078 A | * | 11/1967 | Kleiman | B60P 3/38 |
| | | | | 135/148 |
| 4,099,534 A | * | 7/1978 | Corbin | E04H 15/06 |
| | | | | 135/150 |
| 4,366,979 A | * | 1/1983 | Pillot | B60P 3/38 |
| | | | | 296/160 |
| 5,544,671 A | | 8/1996 | Phillips | |
| 6,035,875 A | | 3/2000 | Chen | |

FOREIGN PATENT DOCUMENTS

| | | | | | |
|---|---|---|---|---|---|
| CN | 112412157 A | * | 2/2021 | | |
| DE | 202021002176 U1 | * | 7/2021 | | |
| KR | 10-2005-0058607 A | | 6/2005 | | |
| KR | 10-2015-0092023 A | | 8/2015 | | |
| KR | 20160001048 A | * | 1/2016 | | |
| KR | 20200114571 A | * | 10/2020 | | |
| WO | WO-2019227265 A1 | * | 12/2019 | | E04H 15/06 |

\* cited by examiner

ROOFTOP TENT FOR VEHICLE

TECHNICAL FIELD

The present invention is directed to a roof-top tent for a vehicle.

BACKGROUND ART

In general, a tent means a prefabricated or mobile house that can be dismantled and carried. Today, this tent is mainly used for military, exploration, mountain climbing, camping, etc., for temporary camping rather than for everyday residential use.

The tents vary in a shape, a size, and a material depending on purpose of use, location, number of people, and seasons, and have a widely various use and scale from the tents used for military and school camping to the large-scale tents used for an outdoor music, a theater, and a circus.

In particular, the tents used for leisure activities such as mountain climbing, camping, and travel have a size that can be carried alone for about 5 to 10 peoples and the tents for leisure include various types of tents such as a triangular shape, a roof shape, a house shape, a single-sided shape, a half-moon shape and a dome shape.

However, although such conventional tents vary in size, those tents are generally bulky so that they are inconvenient to move and difficult to assemble and dismantle as well as the structure thereof is complicated so that failure of the joint part frequently occurs. In particular, in case a user employs a tent for leisure, the user usually moves to a camping site by means of a vehicle, and then installs the prepared tent. However, it is not only difficult to store the tent together with a lot of preparations in the vehicle due to the large volume thereof, but also inconvenient to take the stored tent out of the vehicle and install it.

In addition, since a minimum flat ground must be secured for installing the tent, selection of a location for installing the tent is limited.

In order to solve the problems of the conventional tent described above, a roof-top tent for a vehicle of the patent document 1 below is proposed. In the roof-top tent according to the patent document 1, a tent cloth and a pole are accommodated in a receiving space between a cover and a base plate fixed to the roof of the vehicle, and if the roof-top tent is opened by rotating the cover from the base plate, the tent cloth and the pole automatically spread out to form the tent. Such roof-top tent is often called a car pension, which allows a tent to be placed on the roof of the vehicle and used like a mobile home. This roof-top tent for the vehicle harmonize leisure and car culture, and unlike a large trailer and a camping car, there is an advantage that the roof-top tent can be simply installed on the vehicle and driven.

On the other hand, in case the conventional roof-top tent for a vehicle should be folded back, a user must manually fold and insert the pole and the tent cloth into the space between the cover and the base plate while rotating the cover towards the base plate again. In this case, the tent cloth billowed due to the air present in an inner space of the bulky tent should be folded and pushed into the receiving space. In this process, a part of the tent cloth may be pulled outwardly of an edge of the cover and the base plate, which prevents the cover from being fastened to the base plate. Owing to this, it is very cumbersome to remove the tent cloth again and accommodate it in the receiving space between the cover and the base plate.

Accordingly, there is a demand for the development of a roof-top tent for a vehicle in which the tent is easily installed and then accommodated in the receiving space again.

DISCLOSURE

Technical Problem

Embodiments of the present invention have been made to solve the above-mentioned conventional problems and is intended to provide a roof-top tent for a vehicle that is easy to accommodate the tent in a receiving space again after the tent is installed.

Technical Solution

According to an aspect of the present invention, provided is a roof-top tent for a vehicle comprising: a base plate detachably fixed to the roof of the vehicle, an expansion plate rotatably connected to the base plate to overlap with the base plate, a cover rotatably connected to the base plate and opening and closing an upper surface of the base plate, a tent unit connected to the base plate and spreading out when the cover is rotated from the base plate to allow the upper surface of the base plate to be opened, and a folding assistance unit for assisting the tent unit to prevent the tent unit from being exposed to an outside of the cover when the tent unit is folded back after it is spread out, wherein the tent unit includes a side tent member constituting a side surface thereof, and the folding assistance unit includes a side folding strap connected to at least one of the base plate and the cover.

Advantageous Effects

According to embodiments of the present invention, the present invention has an effect that can provide a roof-top tent for a vehicle with a receiving space which is easy to accommodate back after installation of the tent.

MODES OF THE INVENTION

Figure 1:
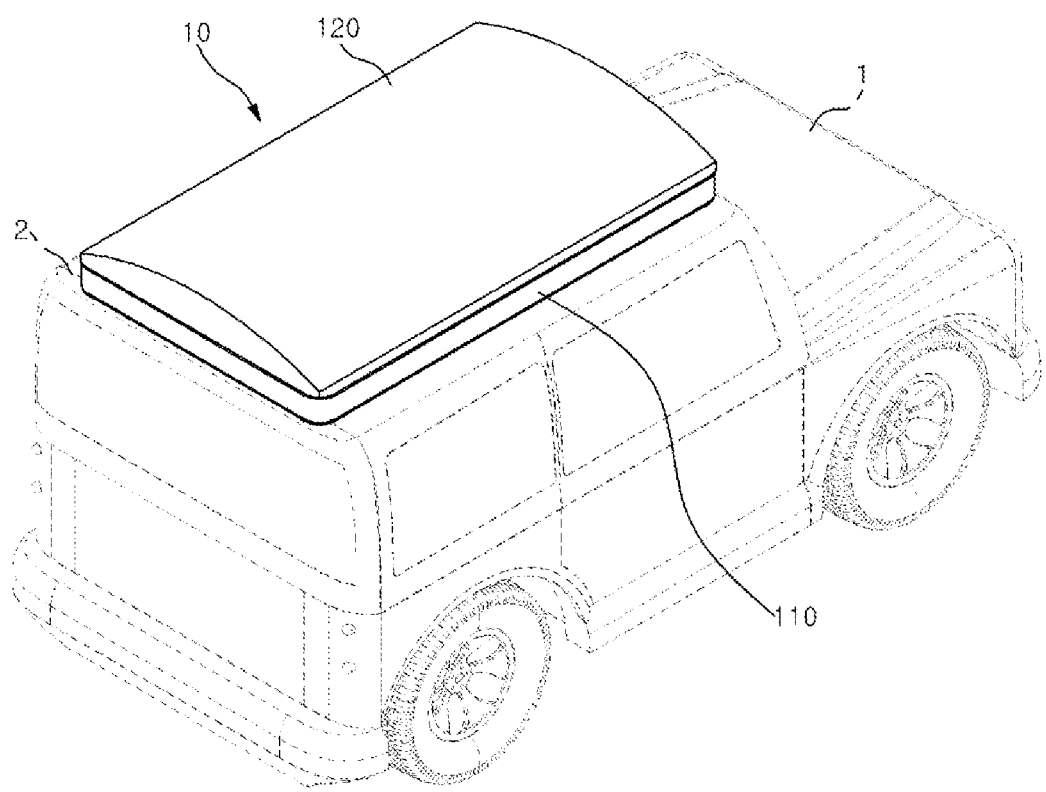
FIG. 1 is a perspective view showing a roof-top tent installed in a roof of a vehicle according to an embodiment of the present invention.

Hereinafter, specific embodiments for implementing the spirit of the present invention will be described in detail with reference to the accompanying drawings.

Further, in the description of the present invention, in case it is determined that the detailed explanation of the related well-known configuration or function may obscure the gist of the present invention, the detailed description thereof will be omitted.

In addition, it is to be understood that when a certain constitutive element is referred to as being 'connected' or 'contacted' to another constitutive element, the constitutive element may be directly connected or contacted with the other constitutive element, but another constitutive element may exist in the middle therebetween.

The terminology used herein is used to describe specific embodiments only and is not intended to limit the present invention. A singular expression includes a plural expression unless the context clearly indicates otherwise.

Hereinafter, a roof-top tent for a vehicle according to an embodiment of the present invention will be described with reference to the accompanying drawings.

Referring to FIGS. 1 to 4, a roof-top tent 10 for a vehicle according to an embodiment of the present invention may be fixedly mounted and carried on a roof 2 of the vehicle 1. After arriving at a campsite, the tent installation can be completed by spreading the tent simply while mounted on the roof 2 of the vehicle 1 for using the tent as a residential purpose. The roof-top tent 10 for the vehicle may be installed to support a portion protruding outside the roof 2 of the vehicle 1 by using a member such as a ladder after the installation of the tent is completed.

The roof-top tent 10 comprises a base plate 110, a cover 120, an expansion plate 130, a tent unit 140, a folding assistance unit 150, and a pole 160.

The base plate 110 is detachably fixed to the roof 2 of the vehicle 1. In addition, the base plate 110 forms a space for accommodating the expansion plate 130, the pole 160, a ladder 134, etc. together with the cover 120 before the tent is installed and plays a role of a floor space available to a user after the installation of the tent is completed.

The base plate 110 may be fixed to a roof rack (not shown) pre-installed in the roof 2 of the vehicle 1 or be directly fixed to the roof 2 of the vehicle 1. However, this is merely an example, and the manner in which the base plate 110 is fixed to the roof 2 may be modified in any way. In addition, since the base plate 110 is made to have a length in the front-rear direction of the vehicle 1 larger than at least the average height of an adult, there may be enough space for the user to lie inside the tent. Further, the base plate 110 may be made of a length of the rim less than the length of the rim of the roof 2 of the vehicle 1, so that the entire base plate 110 is configured to support the roof 2 of the vehicle 1 stably.

The cover 120 is rotatably connected to the base plate 110 and is configured to open and close an upper surface of the base plate 110. The cover 120 may form a receiving space together with the base plate 110 before the tent is installed and be configured to form a side wall or a ceiling of the tent after the tent is installed. In addition, the cover 120 is rotatably connected to the base plate 110 by a hinge to open or close an upper side space of the base plate 110.

In addition, since it is preferred for the cover 120 to have a shape for minimizing resistance of an air when the vehicle is driving, a front side of the cover 120 may be formed in a streamlined shape. However, this is merely an example, and a separate device (not shown) may be additionally configured to reduce the air resistance of the cover 120. The cover 120 may be made of, for example, a plastic material, a metal material such as aluminum, etc., but may be made of a rigid and light plastic material in consideration of fuel saving and ease of use.

On the other hand, the base plate 110 and the cover 120 may be provided with a sealing member (not shown) such as a rubber packing on the rim portion in contact with each other when the tent is closed, through which the rain water does not penetrate and the tent unit 140 accommodated therein may be kept dry. In addition, the base plate 110 and the cover 120 may be further provided with a locking device (not shown) to prevent a third party from easily opening at the outside.

The expansion plate 130 may be rotatably connected to the base plate 110 to overlap with the base plate 110. The expansion plate 130 is rotatably connected to the base plate 110 so as to overlap with the base plate 110 or to spread out from the base plate 110. Thus, the expansion plate 130 is accommodated in the space formed by the base plate 110 and the cover 120 before the tent is installed, and the expansion plate 110 plays a role of the expanded floor space that is available to the user, together with the base plate 110, after the tent is installed.

Figure 2:
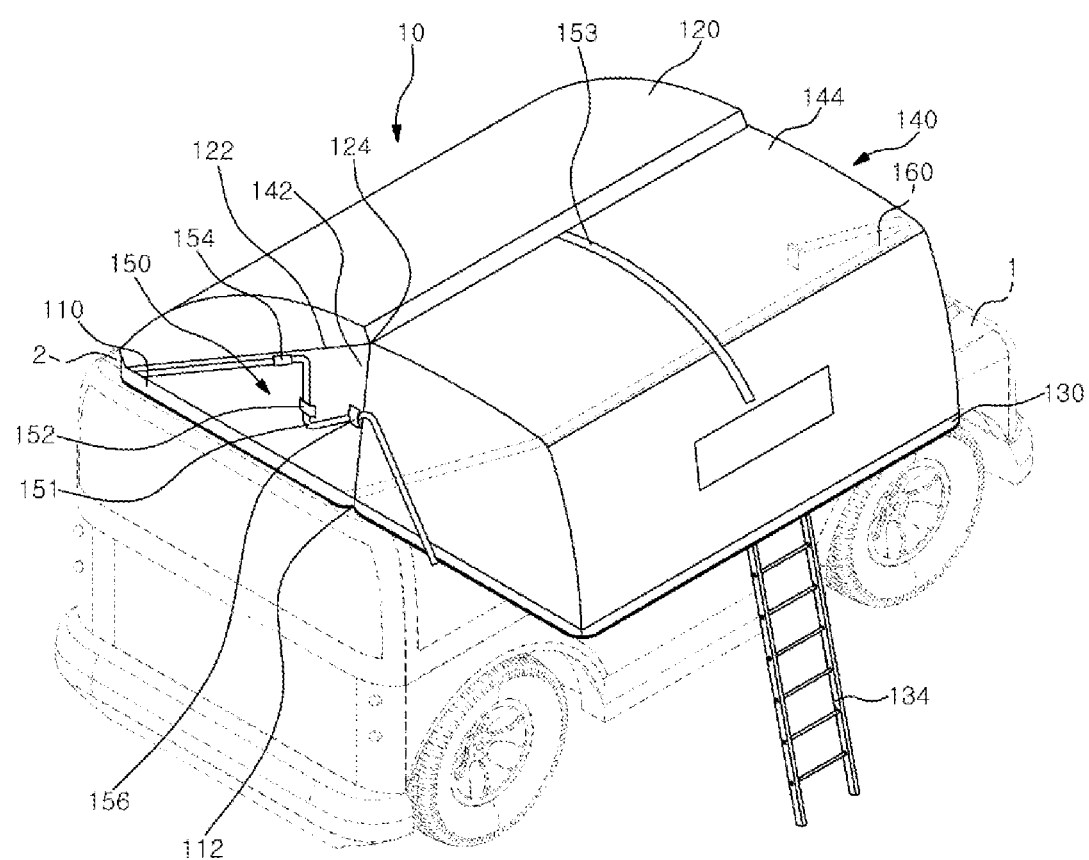
FIG. 2 is a perspective view showing a tent unit in which the roof-top tent of FIG. 1 fully spreads out.
Figure 3:
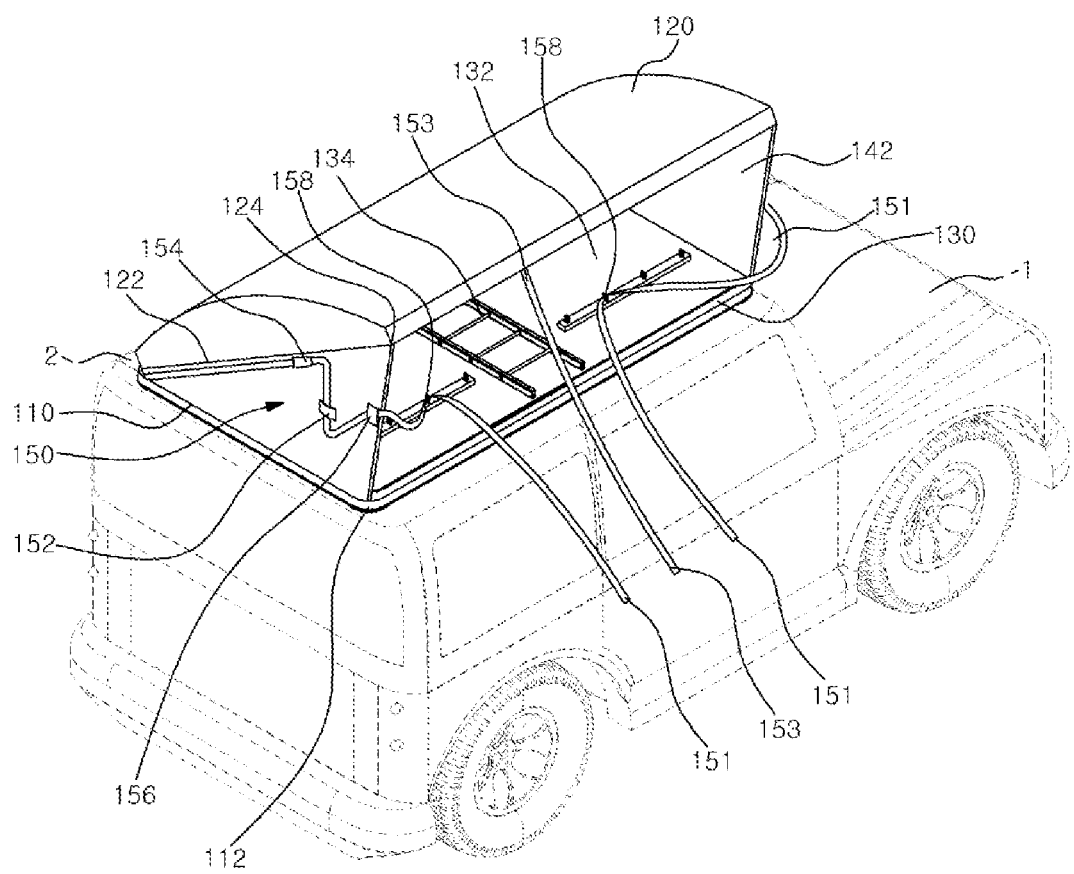
FIG. 3 is a perspective view showing a state in which an expansion plate is folded during a process of folding a tent unit of the roof-top tent of FIG. 1 again.

The expansion plate 130 is rotatably connected to the base plate 110 such that an arrangement which overlaps with the base plate 110 as shown in FIG. 3 (hereinafter referred to as a 'first arrangement') and an arrangement which is approximately parallel with the base plate 110 as shown in FIG. 2 (hereinafter referred to as a 'second arrangement') are achieved. Herein, the term "approximately parallel" may mean, for example, that an angle formed by the expansion plate 130 and the base plate 110 ranges from −10° to +10°. However, this is merely an example, and the scope of the present invention is not limited to such numerical range. In other words, even in case the expansion plate 130 is not only completely parallel to the base plate 110 but also is not parallel due to a design error, a manufacturing error, installation characteristics, and the like, both the cases may fall within the scope of the present patent.

Further, in the second arrangement, an end part of the expansion plate 130 is supported by an end part of the base plate 110 so that the expansion plate 130 can maintain the second arrangement state without falling down any more. In addition, the expansion plate 130 may be made of a significantly hard material to withstand a load of the personnel in use. For example, the expansion plate 130 may be made of an aluminum honeycomb or a corrugate panel.

In addition, the expansion plate 130 may keep the second arrangement state more stable by being supported on the ground by the ladder 134. The ladder 134 is rotatably connected to the expansion plate 130 at the end part thereof so that the ladder 134 may overlap with or spread from the expansion plate 130. In addition, the ladder 134 may be provided on one surface 132 of the expansion plate 130 facing upward when the expansion plate 130 is in the first arrangement state. As a result, the ladder 134 is accommodated in the space formed by the base plate 110 and the cover 120 before the tent is installed, whereas the ladder 134 supports the expansion plate 130 on the ground and can be used as a movement means that allows the passage between the ground and an inner space of the tent after the tent is installed.

The ladder 134 may be a sliding extension ladder, a folding ladder, or a ladder configured to be detachable up and down, thereby being possible to extend or contract the ladder 134. In this case, the ladder 134 may be configured to have a length that can be accommodated by the base plate 110 and the cover 120 when the expansion plate 130 is in the first arrangement state, and may be provided in a variable length so that the length can be extended when switching from the first arrangement to the second arrangement.

The tent unit 140 is connected to the base plate 110 and configured to spread out if the cover 120 is rotated from the base plate 110 to allow the upper surface of the base plate 110 to be opened. The tent unit 140 is connected to the base plate 110, the cover 120, the expansion plate 130, and the pole 160, and plays a role of a side wall and a ceiling of the inner space. In particular, the portion of the tent unit 140 which is located at the upper side connected to the cover 120 may serve to hold the pole 160 so as not to fall toward the expansion plate 130 when the pole 160 is erected. The tent unit 140 may be made of a material such as poly lipstop or poly taffeta to protect the internal space of the tent from rain and wind, foreign substances or an external impact, and may be provided in a state where a teflon processing is performed. In addition, the tent unit 140 may include a window made of a material such as urethane.

The tent unit 140 includes a side tent member 142 constituting a side surface and an upper tent member 144 constituting an upper surface. The upper tent member 144 may be configured such that a part of the upper tent member 144 is interposed between the expansion plate 130 and the base plate 110 when the expansion plate 130 is in the first arrangement state. In addition, the side tent member 142 may be configured to be folded in a substantially triangular shape on both sides of the base plate 110 when the expansion plate 130 is in the first arrangement state.

The folding assistance unit 150 assists the tent unit 140 not to be exposed to an outside of the cover 120 when the tent unit 140 is folded back after it spreads out. To this end, the folding assistance unit 150 may include a side folding strap 151 having one end thereof connected to the base plate 110 and an upper folding strap 153 connected to the cover 120. Herein, the one end of the side folding strap 151 may be configured to be connected to the cover 120 rather than the base plate 110.

In addition, the folding assistance unit 150 may include a side hook 152 provided on the side tent member 142, a cover hook 154 provided adjacent to a boundary 122 of the side tent member 142 and the cover 120, and an edge hook 156 provided on an imaginary straight line connecting a corner portion 124 of the cover 120 and a corner portion 112 of the base plate 110. The present embodiment illustrates as an example that the side hook 152, the cover hook 154, and the edge hook 156 are provided to the side tent member 142, but the spirit of the present invention is not limited thereto. Only any one or two of the side hook 152, the cover hook 154, and the edge hook 156 may be provided. In this case, the side hook 152 and the cover hook 154 may be configured to be arranged on an imaginary vertical line extending in a direction orthogonal to the base plate 110.

The side folding strap 151 may be configured to extend through the side hook 152, the cover hook 154, and the edge hook 156 described above. The present embodiment illustrates as an example that the side folding strap 151 is configured to pass through all the side hook 152, the cover hook 154 and the edge hook 156, but the side folding strap 151 may be configured to extend through only any one or two of them.

In addition, the folding assistance unit 150 may further include an expansion hook 158 provided on one surface 132 of the expansion plate 130, and the side folding strap 151 may be configured to extend through the expansion hook 158. In this case, the one surface 132 of the expansion plate 130 provided with the expansion hook 158 is a surface facing upward when the expansion plate 130 overlaps with the base plate 110.

The pole 160 is rotatably connected to the base plate 110 at both end parts of the pole so that the pole 160 may overlap with or be erected from the base plate 110. Thus, the pole 160 is accommodated in a space formed by the base plate 110 and the cover 120 before the tent is installed, whereas the pole 160 can form an inner space of the tent by supporting the tent unit 140 after the tent is installed.

A shape of the inner space of the tent varies depending on the shape of the pole 160 and, in consideration of this point, the pole 160 may be manufactured in various shapes. For example, the pole 160 may be manufactured in a rounded rectangular shape or a streamlined shape. In addition, the pole 160 is connected to the expansion plate 130 by a soft string such as a cotton fabric or a synthetic fabric so that the pole 160 is accommodated in the inner space formed by the base plate 110 and the cover 120 when the expansion plate 130 is in the first arrangement state and it is erected from the base plate 110 with rotation of the expansion plate 130 when the expansion plate 130 is in the second arrangement state. As a result, when the expansion plate 130 is transitioned from the first arrangement state to the second arrangement state, the pole 160 may be automatically erected to form the shape of the tent.

Hereinafter, a method of spreading and folding a roof-top tent 10 for a vehicle which has the above-described configuration according to an embodiment of the present invention will be described in detail.

As shown in FIG. 1, before the tent spreads out, the cover 120 covers the base plate 110 and has the expansion plate 130, the pole 160, the tent unit 140, and the like accommodated therein. Since this state may mean that a vehicle 1 is driving, the cover 120 may be locked by a locking device (not shown) relative to the base plate 110 to prevent exposure of the internal constitutive elements during driving of the vehicle.

When the tent is installed from the roof-top tent 10 as shown in FIG. 3, a user may raise the cover 120 from the base plate 110 upward. If the cover 120 is completely lifted upward, an open state of the tent may be maintained by not falling downward using a predetermined fixing means (not shown).

Thereafter, the user may lift the expansion plate 130 upward which is in the first arrangement state. If the expansion plate 130 is lifted, the pole 160 is also slowly lifted upward. If the expansion plate 130 fully spreads out, as shown in FIG. 2, the user may erect the ladder 134 at an appropriate angle from the ground while spreading the expansion plate 130 until the expansion plate 130 is in the second arrangement state. In this case, the pole 160 is connected through the cover 120 and the tent unit 140 so that the connected position can be maintained without going over to the expansion plate 130 in the erected state any more.

Meanwhile, the tent unit 140 may be fixed in advance to any one or more of the base plate 110, the cover 120, the expansion plate 130, and the pole 160, or may be fixed separately during or after installation of the tent.

In this regard, it should be noted that the above-described method for installing the roof-top tent 10 for a vehicle is described as an example for convenience of understanding and any other methods in addition to the above-described installation method may be freely applied.

Hereinafter, a method of folding the tent may basically be performed in the reverse order of the method of spreading the roof-top tent 10.

Firstly, a user may rotate the expansion plate 130 in the second arrangement state toward the base plate 110 again to bring it into the first arrangement state as shown in FIG. 3. In this case, the pole 160 is also rotated and folded along with the expansion plate 130 and is interposed between the expansion plate 130 and the base plate 110. In addition, the upper tent member 144 of the tent unit 140 is also folded together with the expansion plate 130 and is interposed between the expansion plate 130 and the base plate 110 as in the case of the pole 160.

Figure 4:
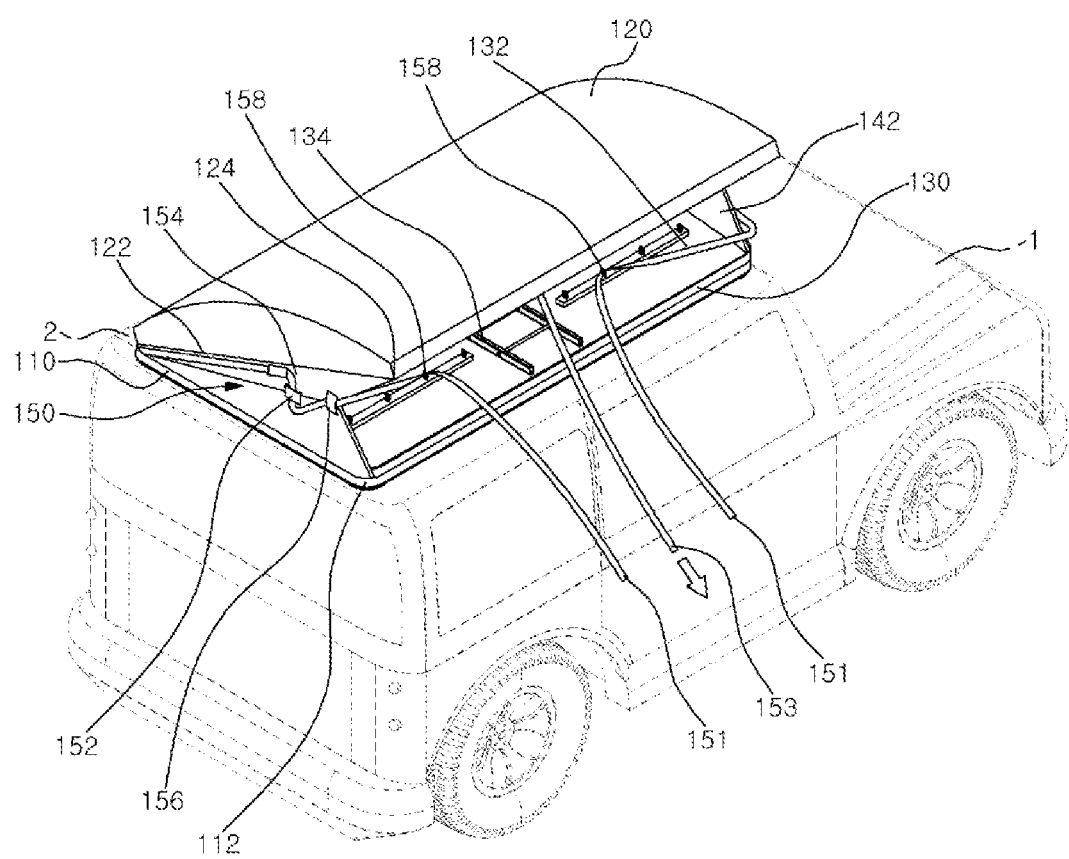
FIG. 4 is a perspective view showing a tent unit of the roof-top tent of FIG. 3 that is folded while being assisted by a folding assistance unit.

Thereafter, the user pulls the upper folding strap 153 and the two side folding straps 151 provided for each of the side tent members 142 on both sides of the tent unit 140 and rotates the cover 120 toward the base plate 110 to allow the upper surface of the base plate 110 to be covered. In this case, the side tent member 142 is easily accommodated into the space between the cover 120 and the base plate 110 while the side tent member 142 is folded by the side folding strap 151, as shown in FIG. 4. Through this process, the cover 120 may be fastened to the base plate 110 as shown in FIG. 1.

According to embodiments of the present invention as described above, the present invention has an effect that can provide a roof-top tent for a vehicle that makes it easy to install the tent and then accommodate it into a receiving space.

Although the embodiments of the present invention have been described in detail, they are nothing but examples and, without being limited thereto, the present invention should be construed to have the broadest scope in accordance with the basic idea disclosed herein. Any person skilled in the art can combine/substitute the disclosed embodiments to achieve a pattern of shapes which are not described herein, and this is also within the scope of the present invention. In addition, any person skilled in the art can easily change or modify the disclosed embodiments based on the present specification and such change or modification are also obvious to belong to the scope of the present invention.

The invention claimed is:

1. A roof-top tent comprising:
   a base plate detachably fixed to a roof of a vehicle,
   an expansion plate rotatably connected to the base plate to overlap with the base plate,
   a cover rotatably connected to the base plate and opening and closing an upper surface of the base plate,
   a tent unit connected to the base plate and spreading out when the cover rotates from the base plate and opens the upper surface of the base plate, and
   a folding assistance unit for assisting the tent unit to prevent the tent unit from being exposed to an outside of the cover when the tent unit is folded back after the tent unit is spread out,
   wherein the tent unit includes a side tent member constituting a side surface thereof, and the folding assistance unit includes a side folding strap connected to at least one of the base plate and the cover,
   wherein one end of the side folding strap is configured to be connected to the base plate or the cover and the side folding strap is configured to extend through at least one hook provided on the side tent member of the tent unit,
   wherein the at least one hook provided on the side tent member includes at least one of a side hook provided on the side tent member, a cover hook provided adjacent to a boundary of the side tent member and the cover, and an edge hook provided on an imaginary straight line connecting a corner portion of the cover and a corner portion of the base plate, and wherein the side folding strap is configured to extend through the at least one of the side hook, the cover hook and the edge hook, and
   wherein the folding assistance unit includes the side hook and the cover hook, and the side hook and the cover hook are arranged on an imaginary vertical line extending in a direction orthogonal to the base plate.

2. The roof-top tent according to claim 1, wherein the folding assistance unit further comprises an upper folding strap connected to the cover.

3. A roof-top tent comprising:
   a base plate detachably fixed to a roof of a vehicle,
   an expansion plate rotatably connected to the base plate to overlap with the base plate,
   a cover rotatably connected to the base plate and opening and closing an upper surface of the base plate,
   a tent unit connected to the base plate and spreading out when the cover rotates from the base plate and opens the upper surface of the base plate, and
   a folding assistance unit for assisting the tent unit to prevent the tent unit from being exposed to an outside of the cover when the tent unit is folded back after the tent unit is spread out,
   wherein the tent unit includes a side tent member constituting a side surface thereof, and the folding assistance unit includes a side folding strap connected to at least one of the base plate and the cover, and
   wherein the folding assistance unit further comprises an expansion hook provided on one surface of the expansion plate, and the side folding strap is configured to extend through the extension hook.

4. The roof-top tent according to claim 3, wherein the one surface of the expansion plate is a surface facing upward when the expansion plate overlaps with the base plate.

* * * * *